United States Patent [19]
Yatcilla et al.

[11] 3,738,509

[45] June 12, 1973

[54] DIRECTIONAL CONTROL APPARATUS FOR A BALE THROWER

[75] Inventors: George E. Yatcilla; James H. Hollyday, both of New Holland, Pa.

[73] Assignee: Sperry Rand Corporation, New Holland, Pa.

[22] Filed: Oct. 6, 1971

[21] Appl. No.: 186,882

[52] U.S. Cl. .......................... 214/42 A, 100/188 BT
[51] Int. Cl. ............................................. B65g 67/22
[58] Field of Search .................................. 214/42 A

[56] References Cited
UNITED STATES PATENTS
2,762,517   9/1956   Eberly............................... 214/42 A Primary Examiner—Robert G. Sheridan
Assistant Examiner—Kenneth Noland
Attorney—John C. Thompson, Joseph A. Brown and James J. Kennedy

[57] ABSTRACT

A bale thrower directional control apparatus has a pivotal linkage system connecting a trailing wagon tongue and a bale thrower pivotally mounted on a bale case that is stiff over the limited arc of movement of the bale thrower and yieldable over the extended arc of movement of the tongue. The linkage system has a main frame with an elongated guide, a slide slideably mounted on said guide and a spring applying a force on the slide away from the pivotal mounting and has a rod pivotally connected to the bale thrower and to the slide to extend in a generally transverse direction to the slide over the limited arc of movement of the bale thrower and pivoting to apply a substantial force component along the slide against the spring to permit the tongue to continue to swing in a greater arc as the bale thrower remains at the end of the limited arc.

12 Claims, 7 Drawing Figures

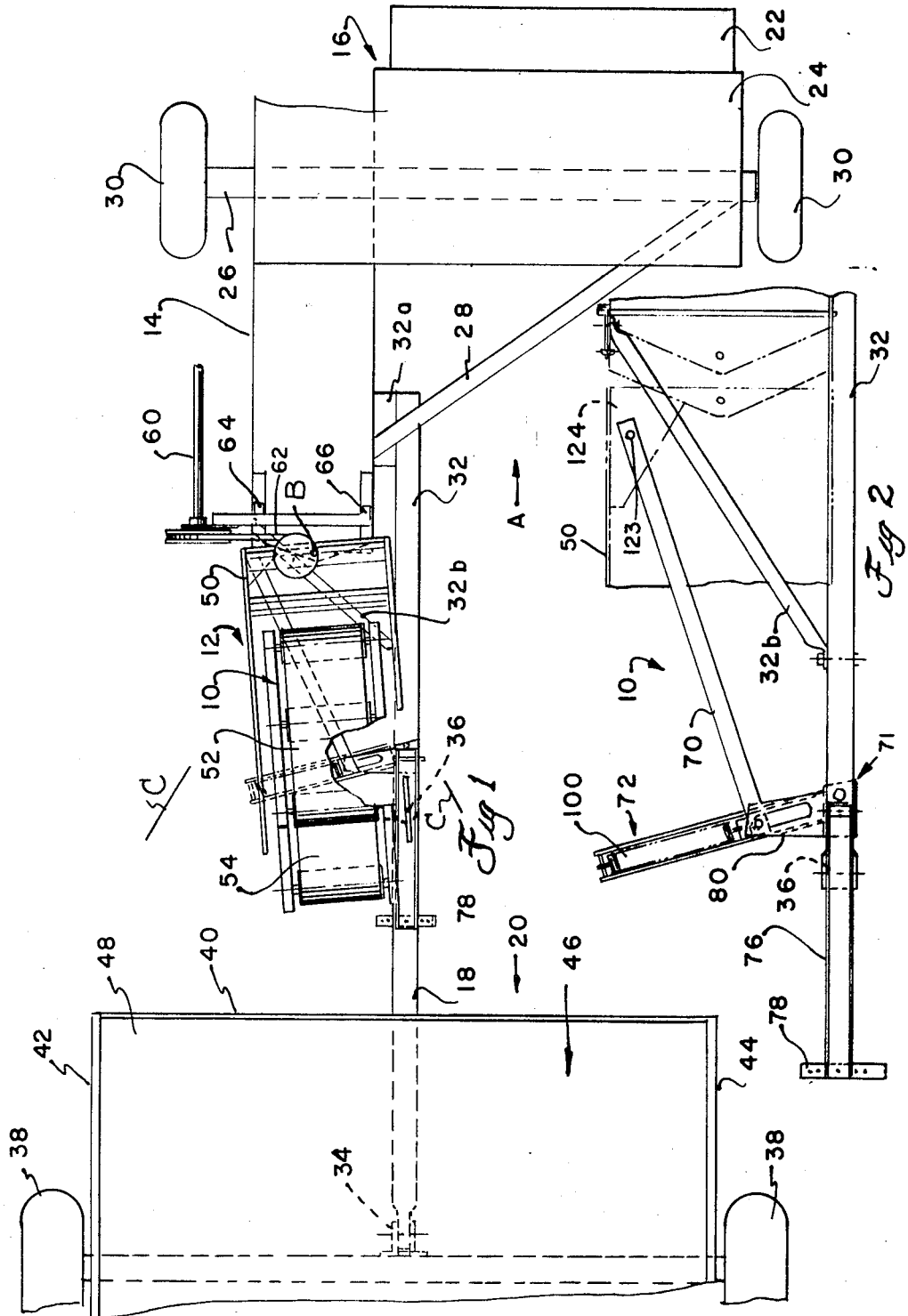

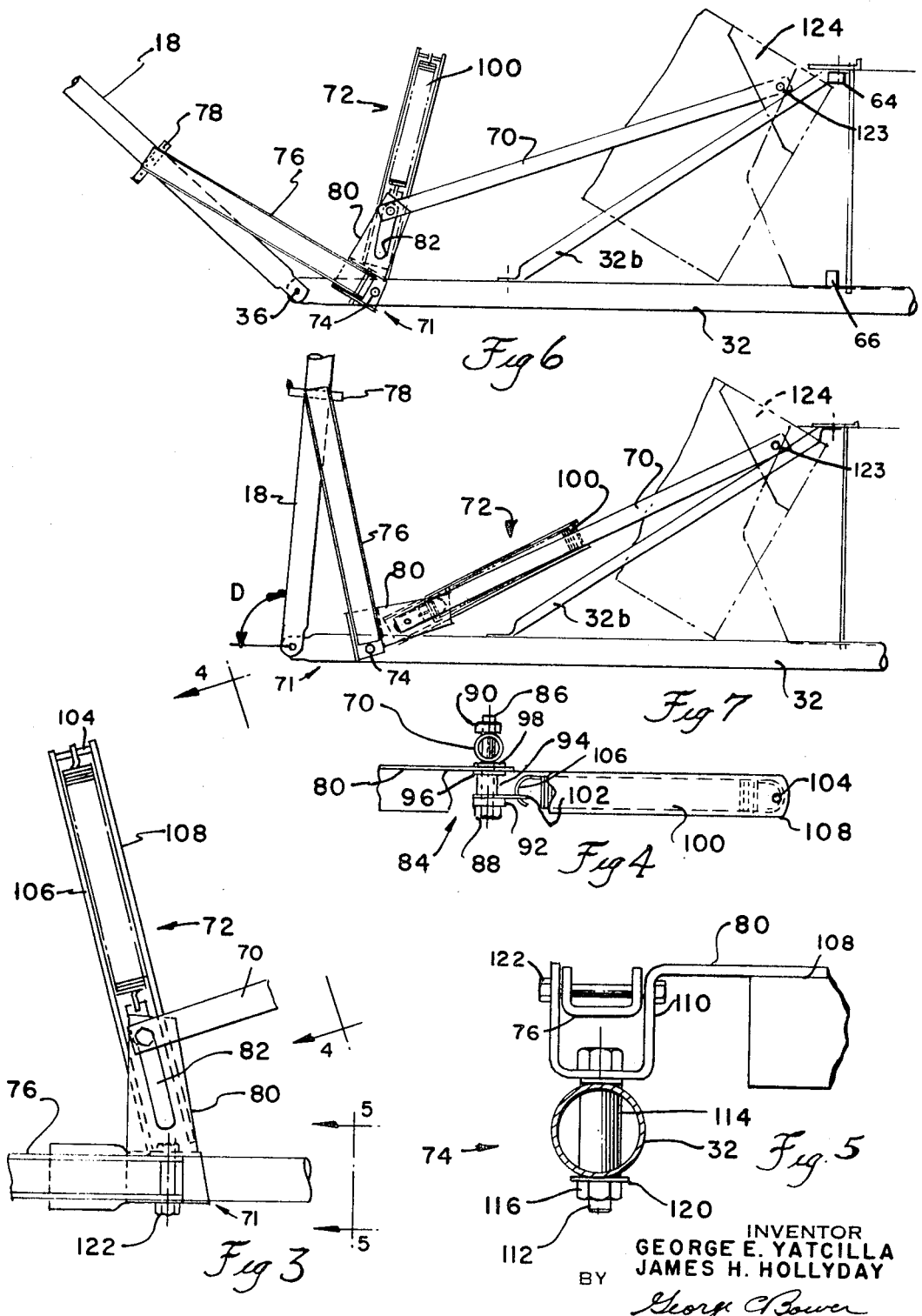

DIRECTIONAL CONTROL APPARATUS FOR A BALE THROWER

FIELD OF THE INVENTION

This invention relates to a directional control apparatus for positioning a baler mounted bale thrower with respect to a trailing bale receiving wagon.

BACKGROUND OF THE INVENTION

Randomly tossing bales by a bale thrower mounted on the bale case of a baler into a trailing wagon is a common method for loading a baled crop. The trailing wagon has a forwardly extending tongue which is pivotally connected to the hitch on the drawing baler. As long as the baler and trailing wagon are moving straight there is no problem in the bale thrower depositing the bales into the wagon. However, when the baler and wagon are turning, the bale thrower is not in line with the wagon and the trajectory of the bale may be over the side of the wagon with the bales landing on the ground. In order to direct the bale thrower towards the trailing wagon in these turns or angulations, the bale thrower is mounted on a pivot about a vertical axis on the discharge end of a bale case, and a link is provided which is connected to the tongue of the bale wagon and the bale thrower in such a manner that as the wagon turns with respect to the baler the bale thrower will be turned so that the tossed bales will drop into the wagon.

The arc which the bale thrower can move is limited by the entry of the discharged bale into the bale thrower. This angle is sufficiently large to accommodate the various angles that occur between the baler and the trailing wagon during normal baling. However, for purposes of maneuvering the baler and trailing wagon, the tongue pivots to greater angles than provided for by the limited arc of the bale thrower. In the past, in order to permit the tongue to pivot to greater angles the link is made resilient so that as the tongue turns greater than the limited arc the connecting link would bend. This resilient link is satisfactory when the baler and trailing wagon are moving over level or substantially level ground and there are no forces on the linkage to incorrectly position the bale thrower. But on steep hillsides the heavy bale in the bale thrower will bend the resilient link and incorrectly direct the tossed bale so that it lands on the ground rather than in the trailing wagon.

OBJECTS OF THE INVENTION

It is the object of this invention to provide a bale thrower directional control linkage or apparatus that properly positions the bale thrower mounted on a bale case in relation to a trailing wagon for both level and hillside operation.

Another object of this invention is to provide a control mechanism that relatively stiffly positions the bale thrower over its limited arc while permitting the tongue of a trailing bale wagon to pivot over a greater maneuvering arc.

Another object of the invention is to provide a bale thrower directional control mechanism that provides a substantially stiff pivotal control of the position of the bale thrower over the limited arc of movement while providing a yielding of the mechanism in positions of the tongue beyond the limited arc.

Another object of this invention is to provide a bale thrower direction control mechanism with the characteristics set forth in the foregoing objects that is inexpensive to manufacture and durable in operation.

These and other objects and advantages of this invention will be apparent from the following description and claims taken in connection with the accompanying drawings which illustrate the various features of this invention.

SUMMARY OF THE INVENTION

In summary, the bale thrower direction control apparatus has a substantially stiff, pivotal condition foor positioning a bale thrower mounted on the aft end of a bale case of baler to pivot over a limited arc for tossing bales into a trailing wagon pivotally connected to the baler and has a yieldable, pivotal condition when the bale thrower reaches the end of the limited arc to permit the wagon to angle over an arc greater than the limited arc.

BRIEF DESCRIPTION OF THE DRAWINGS

FIG. 1 is a top view of the baler with the bale thrower and the trailing wagon pivotally connected to the baler and the directional control apparatus connecting the baler and the trailing wagon.

FIG. 2 is a top view of the directional control apparatus fragmentarily showing the end of the bale case and the bale thrower.

FIG. 3 is a top view of the bracket of the directional control apparatus.

FIG. 4 is a side view of a portion of the bracket taken generally in the direction of the arrow on IV in FIG. 3 with part broken away to illustrate the connection of the spring and the slide on the guide means.

FIG. 5 is an enlarged side view of the pivotal mounting of the bracket on the baler hitch taken generally in the direction of the arrow V in FIG. 3.

FIG. 6 is a top view of the directional control apparatus with the bale thrower in the extreme left position.

FIG. 7 is a top view of the directional control apparatus with the trailing wagon tongue pivoted beyond the limited arc of movement of the bale thrower.

DETAILED DESCRIPTION OF THE PREFERRED EMBODIMENT

The directional control apparatus 10 of this invention is best shown in FIGS. 2, 6 and 7 and is described in connection with the bale thrower 12 (FIG. 1) pivotally mounted on the bale case 14 of the baler 16 and the tongue 18 of the bale receiving wagon 20 drawn by the baler 16.

The baler 16 is of a conventional type pulled by a tractor (not shown) in the direction A. In connection with this direction, the right and left sides of the equipment are referenced. Now as to the operation of the baler, the crop material is gathered by the pickup 22 and delivered to the transverse feed section 24 which deposites charges of crop material into the bale case 14 to form the successive slices of the bale. The plunger mechanism and the knotter mechanism of the bale case forming and tying the bale are not shown. The completed bale is forced rearwardly in the bale case by the subsequent bale being formed and is finally delivered to the bale thrower 12 for delivery to the wagon 20. The feed section and bale case are mounted on the frame of the baler which is represented by the cross beam 26 and the diagonal beam 28. The wheels 30 are rotatably mounted on the opposite ends of the cross beam 26 to moveably support the baler on the ground.

The baler has a hitch 32 rigidly fastened to the right side of the bale case by the plate 32a (FIG. 1) and strut 32b (FIGS. 2, 6 and 7). The hitch extends rearwardly below and to the right of the bale thrower to about the rear end of the bale thrower. The tongue 18 is connected to the wagon 20 by the horizontal pivot 34 and connected to the hitch 32 by the vertical pin 36 so that the baler and trailing wagon can articulate over uneven ground and can relatively angle for turning or maneuvering the baler and wagon.

The trailing wagon 20 is of a conventional type mounted on wheels 38 and has a front wall 40, a rear wall (not shown) and side walls 42 and 44 to form a bale receiving chamber 46 with the bottom 48. The front wall is lower than the side walls for entry of the tossed bales into the chamber 46. The side walls also extend higher to deflect bales into the bale chamber.

The bale thrower 12 is of the continuous running belt type as shown in the U.S. Pat. No. 3,055,519 issued to James H. Hollyday on Sept. 25, 1962 and has a frame 50 pivotally mounted on the top and bottom walls of the bale case to pivot the bale thrower about the vertical axis B through a limited arc C. The frame 50 forms a rectangular passage through which the discharged bales pass to the upper and lower bale throwing means 52 and 54. The bale throwing means have the facing surfaces of the belts driven in the same rearward direction by the drive 60 extending forwardly along the side of the bale case to the power take-off and by the connecting drive 62 coupling the drive 60 to the bale thrower drives (not shown) on the right side of the bale thrower. The belts of bale throwing means grip the discharged bale in the frame and pull it between the belts and arch it in an upward trajectory over the front wall 40 of the wagon.

The arc of movement C is limited by the maximum angle at which the frame can receive and pass the bale from the bale case 14. The support posts 64,66 for the connecting drive 62 function as stops and set the angle to about 30° to each side of the bale case. This angulation is substantially less than the maximum angulation of the tongue 18 with respect to the hitch 32. In moving through a field in a baling operation, the wagon is normally not angled greater than the arc C and the bale thrower 12 is moved by the directional control apparatus 10 to direct the bale thrower towards the wagon over these angles. However, in turning sharp corners for maneuvering the wagon in close quarters or for unloading the wagon, the tongue may turn to a greater angle than permitted by the stops 64 and 66. The directional control apparatus has two operative relationships in order to accommodate the swinging and stop conditions of the bale thrower. In the swing condition the tongue 18 is substantially stiffly connected to the bale thrower over the limited arc of movement, and when the bale thrower is stopped from swinging by contact with one of the posts 64,66 the tongue is yieldably connected over the arc of movement greater than the limited arc C.

The directional control apparatus for accomplishing this includes a rod 70 and a bracket assembly or means 71. The bracket assembly 71 includes a base member 72 which is pivotally mounted on the rear end of the baler hitch 32 for swinging movement about a generally vertical pivot 74, and a tongue connecting member 76 supported on the base member 72 for vertical swinging movement about a horizontal pivot bolt 122 (FIGS. 3 and 5). The tongue connecting member 76 normally extends rearwardly over the tongue 18 and is fastened thereto by the coupling member 78 which consists of a clevis bolted to the rear end of the tongue connecting means 76 and which is adjustably pinned to the tongue 18. The tongue connecting member or link means 76 will cause the base member 72 to pivot as the tongue 18 is angled in relation to the hitch 32 as can best be seen from the comparison of FIGS. 2 and 6.

The base member 72 of the bracket means 71 has a guide means or member 80 to which is secured (by welding or the like) two outwardly extending spaced apart side wall members 106 and 108. The guide member 80 is provided with a slot 82 in its upper surface substantially in line with the vertical pivot 74 and lying in a plane perpendicular to the axis of the pivot 74 as can best be seen from FIG. 4. A slide, indicated generally at 84, is slidably mounted in a slot 82, the slide comprising a bolt 86 with a head 88 and a nut 90 threaded on the opposite end from the head 88, two collars 92 and 94, and two washers 96 and 98. The washers 96 and 98 are on opposite sides of the member 80 and span the slot 82 to hold the slide 84 on the guide member 80. A collar (not shown) is in the slot between the washers. The rod 70 is pivotally connected to the slide 84 between the nut 90 and the upper washer 98. Thus, the bolt 86 with the end of the rod 70 can slide along the slot 82. However, a helical spring 100 has one end connected to a connecting member 102 extending between the collars 92 and 94, and has the other end of the spring 100 connected to the cylindrical pin or beam 104 fastened between the outer ends of the side wall members 106 and 108 of the base member 72. The slotted guide member 80 has a U-shape portion 110 (FIG. 5) connected to the vertical pivot 74 which is formed by a bolt 112 extending through sleeve 114 welded to the hitch 32. The bolt 112 is secured on the opposite side of the hitch 32 by nut 116 bearing against the washer 120. The tongue connecting member 76 is a U-shaped piece fitting in the U-shape portion 110 at one end and pivotally connected thereto by pivotal fastening means in the form of bolt 122 so that it may be pivoted in a vertical plane back over the hitch 32 for storage or to articulate in the field in relation to the baler. This member extends along the hitch when in a forward or folded storage position.

The rod 70 is a rigid tubular member and is connected by pivot 123 at the opposite end from the slide 84 to the gusset plate 124 which is in turn rigidly secured to the bale thrower 12. As illustrated best in FIGS. 3 and 4, the rod 70 is substantially transverse to the slot 82 of the guide member when the bale thrower is in the mid position, shown in FIG. 3 against the outer end of the slot.

In operation, as the trailing wagon 20 and the tongue 18 move from the position illustrated in FIGS. 1 and 2 to the position shown in FIG. 6 the turning forces of the tongue 18 are applied to the tongue connecting member 76 causing it and the base member 72 to pivot about pivot bolt 74. As the tongue connecting member 76 moves through this first range of movement, that is to say over the limited arc C, its turning force will be applied by the base member 72 to the rod 70. During this entire limited range of movement the slide 84 is held against one end of the slot 82 and thus the tongue connecting member 76, base member 72, and rod 70 form a stiff pivotal linkage imposing turning forces upon the bale thrower until the bale thrower contacts the stop 64. It should be noted that initially, that is to say when the wagon and baler are in the position shown in FIGS. 1 and 2, the rod 70 is at substantially right angles to the slot 82 and that there is no tendency for the rod and slide 84 to slide away from one end of the slot 82. However, as the parts move towards the position shown in FIG. 6 there is a force component exerted on the slide which would tend to move it away from the end of the slot 82. However, the sPring force is of such magnitude that such sliding movement is not permitted until the bale thrower contacts the stop 64. Therefore, the only movement of the bale thrower during this range of movement of the tongue 18 will be that caused by the rod acting through pivot 123 and gusset plate 124. It should be noted that the spring force is such that even when the baler is operating on hillsides the weight of a bale, which may weigh up to 100 pounds, is still not sufficient to overcome the spring force applied by spring 100 and thus the bale thrower is always maintained in its proper throwing position with respect to the trailing wagon during its range of movements within arc C.

A second condition occurs when the bale thrower has reached the limit of the arc C by engaging either stop 64 on the left or stop 66 on the right. In the second or stop condition, the tongue 18 may continue to move while the bale thrower is stopped. This continued movement is provided for by the movement of the slide 84 in the slot 82 against the resilient spring 100. When the base member 72 is in the position shown in FIG. 6, the rod 70 applied a substantial force component along the slot 82. As the tongue 18 continues to rotate or turn in the clockwise direction from the position shown in FIG. 6 to the position shown in FIG. 7, the base member 72 moves more into alignment with the rod 70. And as this occurs the slide 84 moves down the slot towards the pivot 74. This may eventually, if the tongue is turned far enough, move to the slide and pivot to the end of the slot against the spring pressure. As seen from FIGS. 6 and 7, the rod 70 pivots through a small angle about the pivot 123 as the base member 72 is moving into the aligned position of FIG. 7. In the aligned position, the pivot 74, slot 82 and pivot 123 are substantially along the same line and, thus, as the base member may continue to rotate in a clockwise direction, the rod 70 can pivot about the pivot 123 while holding the bale thrower in the extreme left position. Thus, the tongue 18 can swing at an angle D greater than 90° from the mid position. Although this may be an undesirable position of the wagon and the baler it may occur and, if it does, no damage is done either to the directional control apparatus or the hitch of the baler. Thus, the tongue 18 may freely move over an arc of greater than 180° while the bale thrower 12 swings between the stop positions and is held in these positions without damage to any of the apparatus.

The foregoing discussion of the operation of the directional control apparatus has been in connection with the bale thrower being at its left position. In the right position the base member is about 60° counterclockwise from the position shown in FIG. 7. Turning of the tongue 18 further in a counterclockwise direction will produce a similar sliding action of the slide 84 in the slot 82 and the slide will reach the pivot or other end of the slot when the base member is extending rearwardly and in line with the rod 70. Here again in this other extreme position, the rod 70 is pivotal about the pivot 122 while retaining the bale thrower in the right extreme position. The spring 100 will hold the slide against the end of the slot 82 and provide a substantially stiff linkage connection between the tongue and the bale thrower over the range of the limited arc C. It is thus seen that the directional control apparatus provides for ample movement of the tongue 18 while providing a firm holding of the bale thrower over the limited arc C.

While this invention has been described in connection with a single embodiment, it will be understood that this embodiment is capable of modification and that this application is intended to cover any variations, uses, or adaptations following, in general, the principles of the invention and including such departues from the present disclosure as come within known or customary practice in the art to which the invention pertains, and as fall within the scope of the invention or the limits of the appended claims.

Having thus described our invention, what we claim is:

1. In combination, a mobile hay baler adapted to travel forwardly and having a fore-and-aft extending bale case,
   a wagon towed behind the baler and having a forwardly extending tongue pivotally connected to the baler to swing over a wide arc as the direction of travel of said baler is changed,
   a bale thrower mounted on said bale case to receive bales therefrom and to toss the received bales rearwardly into said trailing wagon,
   means pivotally supporting said bale thrower on said bale case for lateral swinging movement about a vertical axis over a limited arc of movement less than the arc of movement of said wagon,
   a directional control apparatus comprising
   bracket means pivotally mounted on said baler and having link means connecting said bracket means to said tongue for movement by said tongue over the wide arc of movement,
   said bracket means having elongated guide means extending transverse to the direction of movement of said bracket means and having means slideably mounted on said guide means,
   spring means attached at one end to said bracket means and connected to said slideable means at the other end to apply a force for normally holding said slideable means away from the pivotal mounting of said bracket means,
   a rod,
   first means for pivotally attaching one end of said rod to said bale thrower, and second means for pivotally attaching the other end of said rod to said slideable means.

2. The combination as set forth in claim 1 wherein said baler includes a fore-and-aft hitch, said tongue being pivotally connected thereto to swing generally horizontally, and wherein said bracket means is pivotally mounted on said hitch and is adapted to be turned in a generally horizontal plane by said link means.

3. The combination as set forth in claim 2 wherein said means pivotally supporting said bale thrower is at the front center of said bale thrower and said first means for pivotally attaching one end of said rod being at the lower left front of said bale thrower, said guide means extending to the left of said hitch.

4. The combination as set forth in claim 1 wherein said guide means includes a slot, said slideable means being in engagement with said slot.

5. The combination as set forth in claim 4 wherein said spring means is helical spring connected at one end to said support means and at the other end to said slideable means for holding said slideable means at the end of said guide means away from said pivotal mounting means.

6. The combination as set forth in claim 1 wherein said guide means includes a slot extending from said pivotal mounting means and said slideable means is a pin-like means extending through said slot.

7. In a mobile hay baler adapted to travel forwardly having
   means at the rear for the pivotal connection of the tongue of a wagon towed behind the baler and adapted to permit the tongue to swing over a wide arc and
   a fore-and-aft bale case with a bale thrower adapted to toss the received bales rearwardly into a trailing wagon and being pivotally mounted on said bale case for lateral swinging movement about a vertical axis over a limited arc of movement less than the wide arc;
   a bale thrower directional control apparatus comprising
      bracket means,
      means for pivotally mounting said bracket means on the baler,
      said bracket means having link means for connecting said bracket means to a tongue for movement over the wide arc around said pivotal mounting means,
      said bracket means having elongated guide means extending transverse to the direction of movement of said bracket means around said pivotal mounting means and having means slideably mounted on said guide means,
      spring means attached at one end to said bracket means and connected at the other end to said slideable means to apply a force for normally holding said slideable means away from the pivotal mounting means of said bracket means,
      a substantially rigid rod pivotally attached at one end to said bale thrower and at the other end pivotally attached to said slideable means and over the limited arc extending transversely to the movement of said slideable means on said guide means for transference of bale thrower turning forces between said rod and said guide means and over the wide arc beyond the limited arc said rod pivoting to apply a substantial force against said spring means to move said slideable means along said guide means for permitting said bracket means to continue to rotate after the bale thrower has stopped at the end of the limited arc.

8. In a mobile hay baler adapted to travel forwardly having
   means at the rear for the pivotal connection of the tongue of a wagon towed behind the baler and adapted to permit the tongue to swing over a wide arc and
   a fore-and-aft bale case with a bale thrower adapted to toss the receiving bales rearwardly into a trailing wagon and being pivotally mounted on said bale case for lateral swinging movement about a vertical axis over a limited arc of movement less than the wide arc,
   a bale thrower directional control apparatus comprising
      bracket means having attaching means, a generally horizontal plate-like means with a slot extending from said attaching means, and support means on said plate-like means and extending generally horizontally from the opposite end of said slot from the attaching means and generally in alignment with said slot,
      pin-like slideable means mounted on said plate-like means and in said slot to slide along said slot,
      spring means attached between the spaced end of said support means and said slideable means to hold said slideable means against the end of said slot away from said attaching means,
      said attaching means pivotally mounted on said baler,
      link means connecting said attaching means to the tongue of a wagon for swinging said bracket means over a wide arc and
      a substantially rigid rod for pivotal attachment at one end to a bale thrower and at the other end pivotally attached to said slideable means and, over the limited arc, extending transversely to the movement of said plate-like means for transference of bale thrower turning forces between said rod and plate-like means and, over the extended arc, said rod pivoting to apply a substantial force against said spring means to move said slideable means along said plate-like means for permitting said bracket means and the tongue to continue to rotate after the bale thrower has stopped at the limited arc.

9. For use with a mobile hay baler adapted to travel forwardly and having a fore-and-aft extending bale case with a bale thrower pivotally mounted on the aft end to swing laterally about a vertical axis over a limited arc and a wagon towed behind the baler and having a forwardly extending tongue pivotally connected to the baler to swing over an arc substantially greater than the limited arc;
   a directional control apparatus comprising
      bracket means,
      means for pivotally mounted said bracket means on a baler and having link means for connecting said bracket means to a tongue of a towed wagon for movement by the tongue over the wide arc,
      said bracket means having elongated guide means with slideable means mounted thereon to slide transverse to the pivotal movement of said bracket means,
      spring means attached at one end to said bracket means and connected to said slideable means at the other end to apply a force for normally holding said slideable means away from the pivotal mounting of said bracket means, and
      a substantially rigid rod for pivotal attachment at one end to a bale thrower and at the other end pivotally attached to said slideable means and, over the limited arc, extending generally transversely to the movement of said guide for transference of bale thrower turning forces between said rod and guide means and, over the extended arc, said rod pivoting to apply a substantial force against said spring means to move said slideable means along said guide means for permitting said bracket means and the tongue to continue to rotate after the bale thrower has stopped at the limited arc.

10. A bale thrower directional control apparatus for swinging a bale thrower pivotally mounted on a baler by a tongue connected to the baler for towing a trailing wagon to receive tossed bales from the bale thrower into the wagon throughout a limited arc of angulation of the baler and wagon while permitting the baler and wagon to angulate over a greater arc and comprising bracket means having means for pivotally mounting said bracket means on said baler and means for connection of said bracket means to a tongue pivotally connected to the baler to pivot said bracket means as the pivotally connected tongue is horizontally angulated over the greater arc than said bale thrower, guide means on said bracket means extending from said pivot mounting means and transversely to the pivotal movement of said bracket means around said pivotal means, slideable means slideably mounted on said guide means and adapted to move to and from said pivotal mounting means under a resilient bias, spring means coupled to said bracket means and said slideable means to provide said resilient bias, a rod pivotally connected to said slideable means and connectible to the bale thrower to position the rod substantially transverse to said guide means over the limited arc for transference of turning forces through said rod, said slideable means, said guide means, said bracket means and tongue connecting means and over the greater arc pivoting to apply a substantial force against said slideable means to counter said resilient bias and move the slideable means towards said pivotal mounting means whereby the bracket means and rod can continue to rotate on the bale thrower stopping at the limited arc.

11. A bale thrower directional control apparatus as set forth in claim 10 wherein said resilient bias is in a direction from said pivotal mounting means.

12. A bale thrower directional control apparatus as set forth in claim 10 wherein said bracket means has a support means extending further from said pivotal mounting than said pivotal mounting means than said guide means and with an end spaced from said slideable means, and said spring being connected to said end and said slideable means to apply a force away from said pivotal mounting means.

* * * * *